United States Patent [19]
Yamada

[11] Patent Number: 4,458,991
[45] Date of Patent: Jul. 10, 1984

[54] PHOTOGRAPHIC OBJECTIVE OF REDUCED SIZE

[75] Inventor: Yasuyuki Yamada, Tokyo, Japan

[73] Assignee: Canon Kabushiki Kaisha, Tokyo, Japan

[21] Appl. No.: 345,643

[22] Filed: Feb. 4, 1982

[30] Foreign Application Priority Data

Feb. 14, 1981 [JP] Japan ................................. 56-20312

[51] Int. Cl.$^3$ .............................................. G02B 9/60
[52] U.S. Cl. ..................................... 350/465; 350/432
[58] Field of Search ................................. 350/465, 432

[56] References Cited

U.S. PATENT DOCUMENTS 4,368,956   1/1983   Yamada et al. ..................... 350/432

FOREIGN PATENT DOCUMENTS 53-0021926   2/1978   Japan ................................. 350/465

Primary Examiner—John K. Corbin
Assistant Examiner—Rebecca D. Gass
Attorney, Agent, or Firm—Toren, McGeady and Stanger

[57] ABSTRACT

A photographic objective of reduced size having five lens components of which the 1st and 2nd counting from the front are meniscus lenses of positive powers convex toward the front, the 3rd is a lens of negative power, the 4th is a lens of positive power, and the 5th is a meniscus lens of negative power concave toward the front. The various lens components have characteristics to effect proper aberration correction.

1 Claim, 12 Drawing Figures

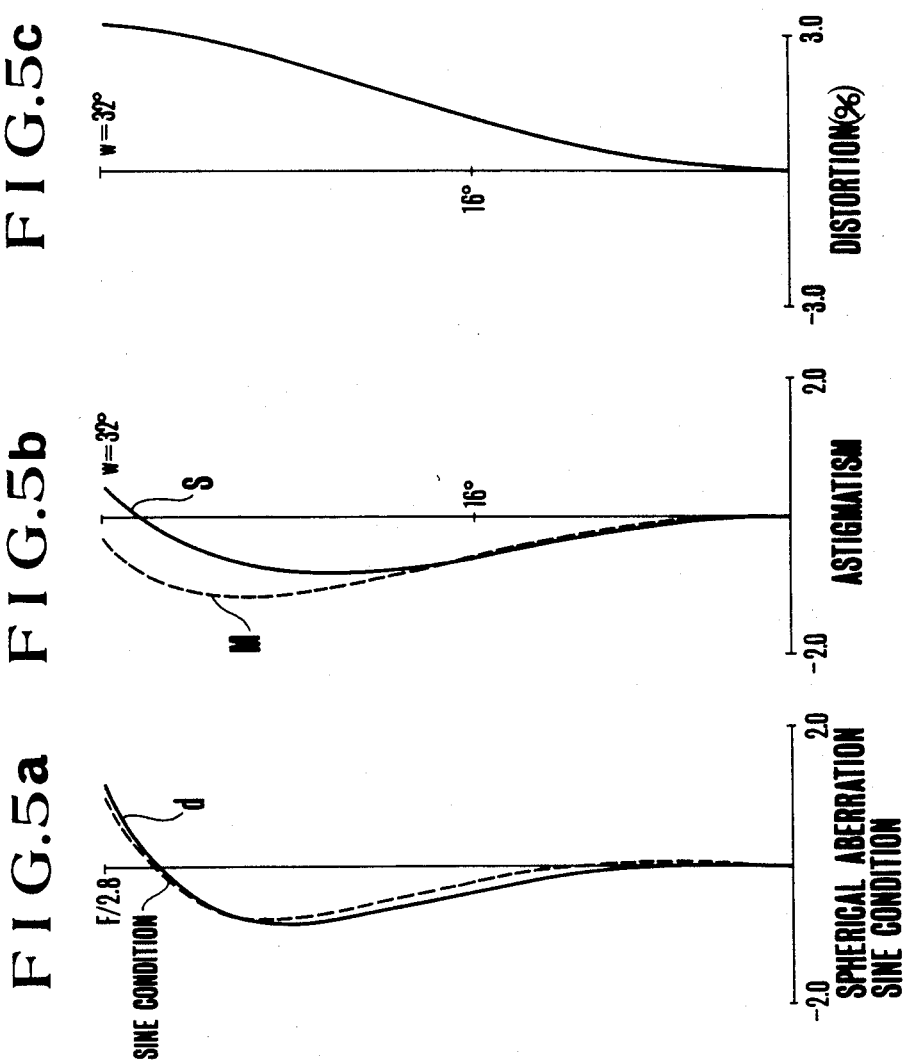

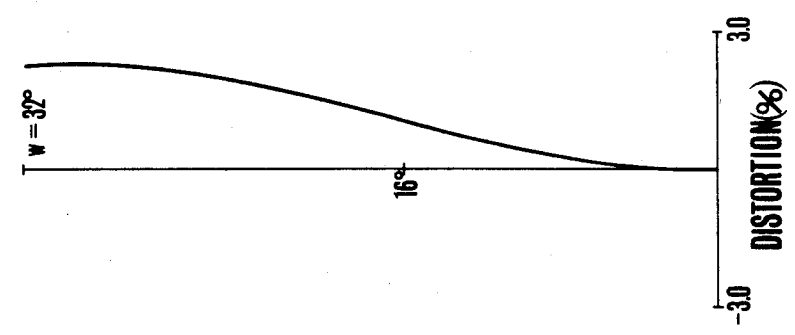
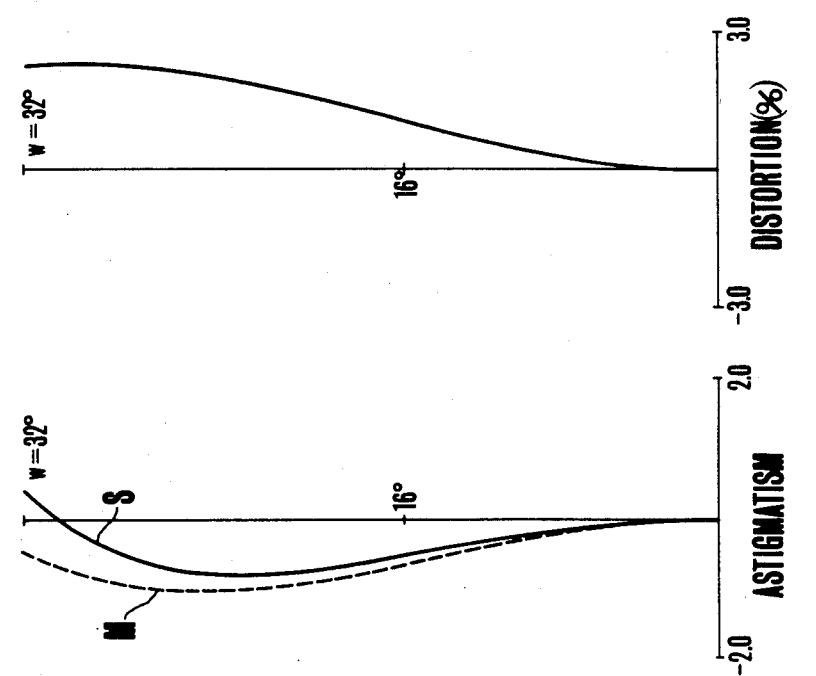
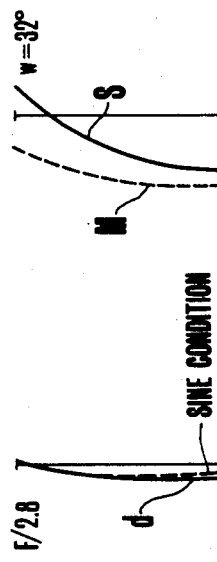

PHOTOGRAPHIC OBJECTIVE OF REDUCED SIZE

BACKGROUND OF THE INVENTION

1. Field of the Invention

This invention relates to photographic objectives of a wide image angle while still reducing the size by shortening the total length of the lens system, or the distance from the lens system's 1st lens surface to the focal plane.

2. Description of the Prior Art

Recently, as minimization of the bulk and size of cameras advances, there is an increasing demand for compact objective lenses in which the total length of the lens system is reduced. In order to reduce the total length of the lens system below the focal length, it is desirable to construct the lens system from a front group of positive power and a rear group of negative power. Such power distribution has found many uses in long focal length lenses but is seldom applied to wide angle lenses of 60° or more with increased relative apertures and short total lengths of the lens systems.

With this kind of power distribution, as the total length shortens, as the relative aperture increases, as the image angle widens, distortion and astigmatism, or comatic aberration and halo objectionably increase.

For example, Japanese Pat. No. 44-10831 discloses a lens system of such power distribution, but the specific objective described there has an angular field of 46°, which belongs to the category of standard objectives and calls for an increase in the astigmatic difference when there is an increase in the image angle. Also shown in Japanese Pat. No. 52-48011 is an objective which has, however, an F-number of 1:4.5. This speed is not sufficiently fast.

SUMMARY OF THE INVENTION

It is an object of the present invention to provide a compact photographic objective of reduced size with a minimum of constituent lens elements and a shortened lens system length.

In embodiments to be described, there will be disclosed photographic objectives having five lens components with an increased F-number to 1:2.8 while still increasing the angular field up to 64°.

BRIEF DESCRIPTION OF THE DRAWINGS

FIGS. 4a to 4c, FIGS. 5a to 5c and FIGS. 6a to 6c are graphic representations of the aberrations of the respective objectives of FIGS. 1 to 3.

DETAILED DESCRIPTION OF THE PREFERRED EMBODIMENTS

Figure 1:
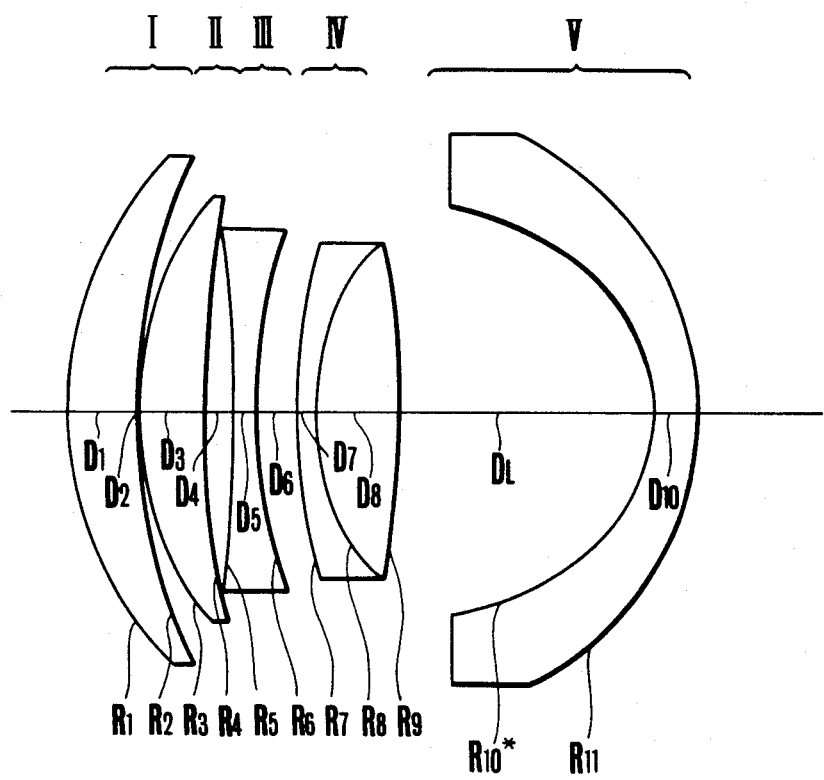
FIGS. 1, 2 and 3 are respectively lens block diagrams of Example 1, Example 2 and Example 3 embodiments of photographic objectives of reduced size, according to the present invention.

The photographic objective of the invention includes, from front to rear, a positive meniscus 1st lens component I convex toward the front, a positive meniscus 2nd lens component II convex toward the front, a negative 3rd lens component III, a positive 4th lens component IV and a negative meniscus 5th lens component concave toward the front. When D6 denotes the axial separation between the 3rd and 4th lens components and f the focal length of the entire system, the following condition is satisfied:

$$0.01 < D6/f < 0.1 \tag{1}$$

When $f_{1234}$ denotes the overall focal length of the 1st to 4th lens components I to IV, f5 the focal length of the 5th lens component V and DL the axial air separation between the 4th and 5th components IV and V, the following conditions are satisfied:

$$1.2 < f/f_{1234} < 1.8 \tag{2}$$

$$-2.0 < f/f5 < -0.5 \tag{3}$$

$$0.1 < DL/f < 0.4 \tag{4}$$

A further preference is that when R1 denotes the radius of curvature of the front surface of the 1st lens component, and R2 the radius of curvature of the rear surface thereof, the following condition is satisfied:

$$2.5 < (R2+R1)/(R2-R1) < 7 \tag{5}$$

Another preference is that the front surface of the 5th lens component is made aspheric. In addition, assuming an X axis in the axial direction, a Y axis in a direction perpendicular to the optical axis, and the direction in which light proceeds as positive with an origin at the point of intersection of the front vertex with the X axis, and letting $\Delta X$ denote the difference between the front or aspherical surface of the 5th lens component and a spherical surface extends from the paraxial region of the front surface which contributes to the determination of the focal length, the equation for the aspheric surface is expressed by:

$$\Delta X = \frac{(1/R^*)Y^2}{1 + \sqrt{1 - (Y/R^*)^2}} + a_1 Y^2 + a_2 Y^4 + a_3 Y^6 \ldots +$$

$$b_1 Y^3 + b_2 Y^5 + \ldots \frac{(1/R)Y^2}{1 + \sqrt{1 - (Y/R)^2}}$$

where R is the radius of curvature of the paraxial region of the front surface of the 5th lens component, R* is the radius of curvature of a spherical surface defined in the equation $$R = \frac{1}{1/R^* + 2a_1},$$

ai is the even coefficient of the aspheric surface, and bi is the odd coefficient of the aspheric surface, wherein the value of $\Delta X$ at the height of $R \times 0.7$ in Y-ordinate is represented by $\Delta X[0.7 \times R]$, and the value of $\Delta X$ at the height of $R \times 0.5$ is represented by $\Delta X[0.5 \times R]$, it is desirable to satisfy the following conditions:

$$0.0005 < |\Delta X \times [0.7 \times R]/f| < 0.01 \tag{6}$$

$$0 < |\Delta X \times [0.5 \times R]/f| < 0.0005 \tag{7}$$

Furthermore, it is preferable that the 3rd lens component III is in the form of a bi-concave lens, and the 4th lens component IV is in the form of a bi-convex lens.

The reasons for these conditions are set forth below.

The photographic objective in accordance with the invention is a reduced size telephoto type in order to make the total length of the lens as short as possible. It is preferable to impart into the front group of the lens system a strong refractive power, and into the rear group a strong negative refractive power. But, if the refractive power is strengthened too much, aberration correction becomes difficult to achieve. In embodiments of the present invention the two positive lenses of the front group have a meniscus form which is convex toward the front, thus taking the individual respective fractions of the positive refractive power. Such configuration of the front group to strong positive power and the rear group to strong negative power produces extraordinarily strong positive distortion so that windening of the image angle becomes difficult. Using a negative lens component and a positive lens component arranged behind the 2nd lens component II, the positive distortion produced in the front group is minimized as much as possible, and further spherical aberration, astigmatism, field curvature and coma, too, are corrected. After an air separation suitably chosen to minimize the coma flare, the 4th lens component is followed by the 5th lens component in the form of a negative meniscus lens concave toward the front. Without causing various badly deteriorated aberrations, a shortening of the total length of the lens system is achieved. Condition (1) signifies that when the lower limit is exceeded, under-correction of the meridional image surface results, and, as the astigmatic difference increases, stronger positive distortion results than is acceptable. Furthermore, the lateral chromatic aberration is also increased in the positive sense, thus correction of the various aberrations becomes very difficult. When the upper limit is exceeded, the total length of the lens system is elongated and widening of the image angle becomes difficult.

To further facilitate an improvement in the aberrations and a shortening in the total length of the lens system, it is preferable to set forth additional conditions (2) to (7). Condition (2): When the lower limit is exceeded, as the back focus becomes difficult to shorten, the total length cannot be shortened. When the upper limit is exceeded, because the positive refractive power of the front group is too strong, strong positive distortion is produced, the meridional image surface is also under-corrected with an increase in the astigmatic difference, and strong outward coma is produced. Condition (3): When the upper limit is exceeded, because the negative refractive power of the rear group is too weak, it becomes difficult to shorten the total length of the lens system. When the lower limit is exceeded, because the negative refractive power of the rear group is too strong, strong positive distortion results. The meridional image surface is also under-corrected with an increase of astigmatic difference and strong outward coma is produced. Condition (4): When the upper limit is exceeded, the corner illumination is far less than the central one. When the lower limit is exceeded, astigmatic difference is increased and lateral chromatic aberration also becomes large and positive.

Since the objective of shortened total length is realized by strengthening the combined refractive power of the 1st to 4th lens components and also the negative refractive power of the 5th lens component simultaneously, the pin cushion type distortion is objectionably increased. Therefore, to compensate for the distortion, the negative 3rd lens component III has its concave front surface turned towards the front with the production of barrel type distortion which is balanced out over the entire lens system. However, the forwardly concave form of the front surface of the 3rd lens component III though advantageous with respect to barrel type distortion, simultaneously causes over-correction of spherical aberration. Here, a positive meniscus lens having a radius of curvature which is as concentric to the diaphragm as possible, is arranged on the object side so that while the production of distortion is as suppressed as possible, spherical aberration is corrected. That is, when the lower limit of condition (5) is exceeded, the distortion resulting from the increase of the angular field becomes very difficult to correct. When the upper limit is exceeded, correction of spherical aberration is difficult and it is impossible to provide the objective with an increased relative aperture.

Condition (6) concerns the aberration correction of the marginal zone. In the type of objective where a negative meniscus lens lies in the rearmost position of the lens system as in the present invention, this negative meniscus lens deteriorates astigmatism correction in the negative direction, and produces positive distortion, inward coma and halo. Condition (6) corrects such deteriorated astigmatism, positive distortion, inward coma and halo. That is, when the lower limit is exceeded, though the positive distortion and halo can be corrected, the sagittal image surface is over-corrected, and strong inward coma is also produced. When the upper limit is exceeded, though correction of coma is possible, insufficient correction of positive distortion can be carried out. To achieve correction of aberrations in the marginal, it is of importance to set forth condition (6). Condition (7) concerns aberration correction particularly of the intermediate zone. That is, when the lower limit is exceeded, under-correction of the meridional image surface results in the intermediate zone, and the astigmatic difference too is increased with the production of strong inward coma. When the upper limit is exceeded, under-correction of spherical aberration results, and halo is produced in the intermediate zone. Therefore, to achieve proper correction of aberrations in the intermediate zone, it is of importance to set forth condition (7). It is noted that the 5th lens component V or aspherical lens may be manufactured of a synthetic resin material. If so, an inexpensive photographic objective can be obtained.

As has been described above, the front surface of the 3rd lens component III is configured with a concave shape toward the front for the purpose of correcting distortion. On the other hand, since the 3rd lens component III is required to contribute to the negative power in the fundamental power distribution over the entire lens system, the concave rear surface is turned towards the rear by imparting the negative power thereto without bringing about unduly large stress. Also the rear surface of the 4th lens component IV is configured in a convex shape towards the rear so that the rays of light emerging from this surface are moderately incident upon the strongly curved concave surface of the 5th lens component V. Since this 4th lens component IV is required to contribute to the positive power, the front surface is configured in a convex shape towards the front.

Figure 2:
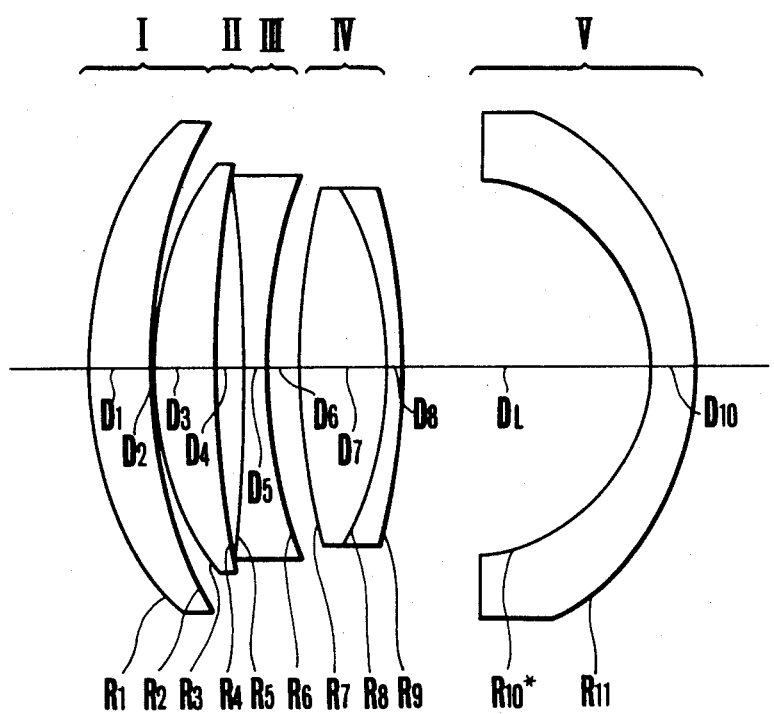
Figure 3:
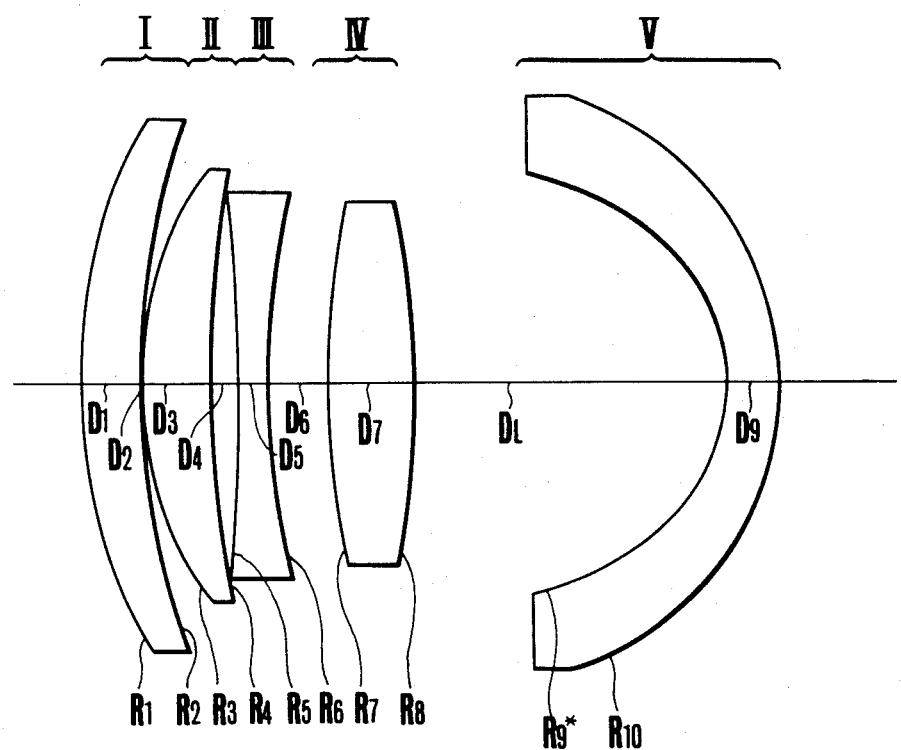
Figures 4A, 4B, 4C:
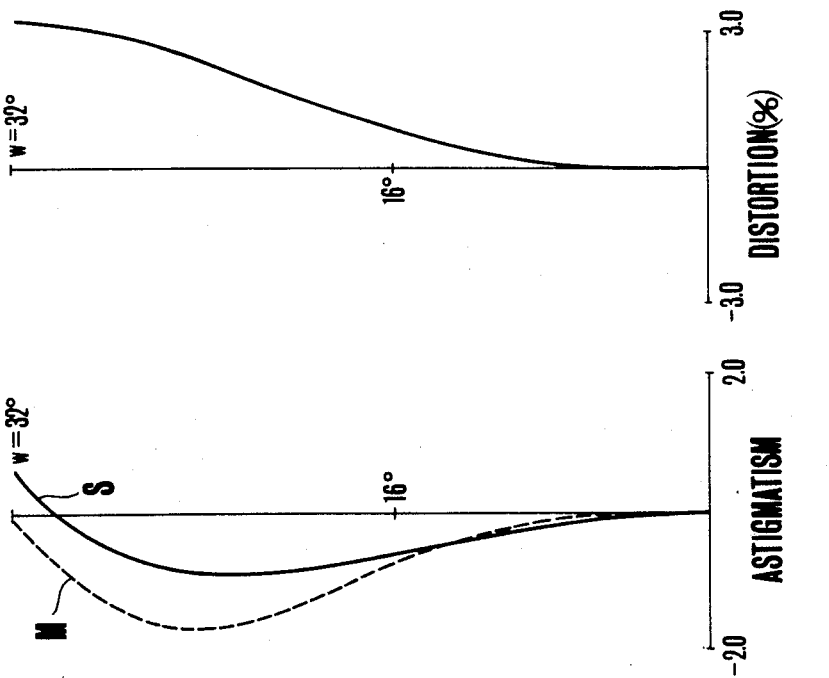

The 4th lens component may be constructed in the form of a doublet consisting of positive and negative lenses cemented together as illustrated in FIGS. 1 and 2. The advantage is that the total length of the lens system can be made shorter than the lens system of FIG. 3 which has no cemented lens because of the possibility of reducing the absolute value of the Petzval sum. Focusing can be performed either by imparting independent movement to the front group of the 1st to 4th lens components, or by moving the 1st to 5th lens components as a whole. In the former case, as the variation range of the aberrations during focusing is smaller, there are fewer image aberrations over the entire focusing range. The diaphragm may be selectively positioned in the spaces between the 3rd and 4th lens components and between the 4th and 5th lens components.

Three examples of specific objectives of the invention which satisfy the above-cited various conditions can be constructed in accordance with the numerical data given in the following tables for the radius of curvature, Ri, of the i-th surface counting from the front, the axial thickness or air separation, Di, between the i-th and (i+1)th surfaces, where DL is the air separation between the 4th lens component and the 5th lens component, and the refractive index, Ni, and Abbe number, $\nu i$, for the spectral d line of the glass of the i-th lens element.

EXAMPLE 1

| F = 100 | | FNo = 1:2.8 | $2\omega = 64°$ |
|---|---|---|---|
| R 1 = 30.38 | D 1 = 6.33 | N1 = 1.65160 | $\nu 1$ = 58.6 |
| R 2 = 48.21 | D 2 = 0.29 | | |
| R 3 = 29.12 | D 3 = 6.06 | N2 = 1.56384 | $\nu 2$ = 60.7 |
| R 4 = 83.04 | D 4 = 2.52 | | |
| R 5 = −221.77 | D 5 = 1.90 | N3 = 1.84666 | $\nu 3$ = 23.9 |
| R 6 = 44.21 | D 6 = 3.85 | | |
| R 7 = 48.12 | D 7 = 1.45 | N4 = 1.81600 | $\nu 4$ = 46.6 |
| R 8 = 20.07 | D 8 = 8.21 | N5 = 1.62096 | $\nu 5$ = 35.9 |
| R 9 = −72.49 | DL = 24.04 | | |
| R*10 = −17.68 | D10 = 4.17 | N6 = 1.49171 | $\nu 6$ = 57.4 |
| R 11 = −25.82 | | | |

*Aspherical Surface (10th Surface)
a1 = −0.82567 × $10^{-2}$    b1 = −0.27542 × $10^{-4}$
a2 = 0.10247 × $10^{-5}$    b2 = 0.16905 × $10^{-5}$
a3 = −0.20236 × $10^{-6}$    b3 = −0.58172 × $10^{-8}$
a4 = 0.14768 × $10^{-8}$    b4 = −0.60362 × $10^{-10}$
a5 = 0.72505 × $10^{-12}$

EXAMPLE 2

| F = 100 | | FNo = 1:2.8 | $2\omega = 64°$ |
|---|---|---|---|
| R 1 = 30.33 | D 1 = 5.64 | N1 = 1.65160 | $\nu 1$ = 58.6 |
| R 2 = 46.60 | D 2 = 0.29 | | |
| R 3 = 28.27 | D 3 = 5.82 | N2 = 1.51633 | $\nu 2$ = 64.1 |
| R 4 = 92.14 | D 4 = 2.29 | | |
| R 5 = −175.65 | D 5 = 2.20 | N3 = 1.84666 | $\nu 3$ = 23.9 |
| R 6 = 41.88 | D 6 = 3.36 | | |
| R 7 = 65.81 | D 7 = 7.96 | N4 = 1.63636 | $\nu 4$ = 35.4 |
| R 8 = −29.57 | D 8 = 1.45 | N5 = 1.81600 | $\nu 5$ = 46.6 |
| R 9 = −53.41 | DL = 22.93 | | |
| R*10 = −16.58 | D10 = 4.19 | N6 = 1.49171 | $\nu 6$ = 57.4 |
| R 11 = −24.02 | | | |

*Aspherical Surface (10th Surface)
a1 = −0.58796 × $10^{-2}$    b1 = −0.11655 × $10^{-3}$
a2 = 0.14912 × $10^{-4}$    b2 = 0.62093 × $10^{-6}$
a3 = −0.21016 × $10^{-6}$    b3 = −0.21913 × $10^{-8}$
a4 = 0.15212 × $10^{-8}$    b4 = −0.69879 × $10^{-10}$
a5 = 0.70012 × $10^{-12}$

EXAMPLE 3

| F = 100 | | FNo = 1:2.8 | $2\omega = 64°$ |
|---|---|---|---|
| R 1 = 44.68 | D 1 = 5.40 | N1 = 1.69680 | $\nu 1$ = 55.5 |
| R 2 = 64.82 | D 2 = 0.35 | | |
| R 3 = 31.52 | D 3 = 6.50 | N2 = 1.56384 | $\nu 2$ = 60.7 |
| R 4 = 111.28 | D 4 = 2.15 | | |
| R 5 = −170.28 | D 5 = 2.74 | N3 = 1.84666 | $\nu 3$ = 23.9 |
| R 6 = 59.88 | D 6 = 5.61 | | |
| R 7 = 84.89 | D 7 = 7.96 | N4 = 1.63636 | $\nu 4$ = 35.4 |
| R 8 = −81.10 | DL = 28.98 | | |
| R* 9 = −18.20 | D 9 = 5.02 | N5 = 1.49171 | $\nu 5$ = 57.4 |
| R 10 = −25.39 | | | |

*Aspherical Surface (9th Surface)
a1 = −0.50414 × $10^{-2}$    b1 = −0.94866 × $10^{-4}$
a2 = 0.86028 × $10^{-5}$    b2 = 0.55673 × $10^{-6}$
a3 = −0.12427 × $10^{-6}$    b3 = 0.23637 × $10^{-9}$
a4 = 0.53662 × $10^{-9}$    b4 = −0.22204 × $10^{-10}$
a5 = 0.14175 × $10^{-12}$

| Values of the Factors for Examples 1, 2 and 3 f = 100 mm   FNo = 1:2.8 | | | | | | |
|---|---|---|---|---|---|---|
| | Total Length (When f* = 34.5 mm) | D6/f | f/f1234 | f/f5 | DL/f | $\frac{\|\Delta X[0.7R]\|}{f}$ | $\frac{\|\Delta X[0.5R]\|}{f}$ |
| Ex. 1 | 30.0 | 0.0385 | 1.5231 | −1.4972 | 0.2404 | 0.002679 | 0.0004741 |
| Ex. 2 | 31.1 | 0.0336 | 1.5435 | −1.2921 | 0.2293 | 0.0047629 | 0.0010751 |
| Ex. 3 | 33.0 | 0.0561 | 1.4344 | −1.0523 | 0.2898 | 0.0038598 | 0.0009919 |

Notice f* is the actual focal length

What is claimed is:

1. A photographic objective of reduced size which comprises:

five lens components, from front to rear, a 1st lens component and a 2nd lens component being meniscus lenses of positive power convex towards the front, a 3rd lens component being a lens of negative power, a 4th lens component being a lens of positive power, and a 5th lens component being a meniscus lens of negative power concave towards the front, wherein D6 denotes the air separation between said 3rd component and said 4th lens component, f denotes the focal length of the entire lens system, and the relationship 0.01 < D6/f < 0.1 is satisfied, wherein $F_{1234}$ denotes the overall focal length of said 1st lens component, 2nd lens component, 3rd lens component and 4th lens component, f5 denotes the focal length of said 5th lens component, and DL denotes the air separation between said 4th lens component and said 5th lens component, and the relationships 1.2 < f/$f_{1234}$ < 1.8

−2.0 < f/f5 < −0.5 and 0.1 < DL/f < 0.4 are satisfied, wherein R1 denotes the radius of curvature of the front surface of the aforesaid 1st lens component, and R2 the radius of curvature of the rear surface thereof, and the relationship $$2.5 < (R2+R1)/(R2-R1) < 7$$

is satisfied,
wherein the aforesaid 5th lens component is an aspherical surface defined by taking an X axis in the axial direction, a Y axis in the direction perpendicular to the optical axis, and the direction in which light proceeds as positive with an origin at the intersection point of the front vertex of the lens and the X axis and letting $\Delta X$ denote the X axis directional difference between the front or aspherical surface of the aforesaid 5th lens component and a surface obtained by extending the spherical surface which contributes to the determination of the focal length, as:

$$\Delta X = \frac{(1/R^*)Y^2}{1 + \sqrt{1 - (Y/R^*)^2}} + a_1 Y^2 + a_2 Y^4 + a_3 Y^6 \ldots$$
$$+ b_1 Y^3 + b_2 Y^5 + \ldots - \frac{(1/R)Y^2}{1 + \sqrt{1 - (Y/R)^2}}$$

wherein R is the radius of curvature of the paraxial region of the front surface of the aforesaid 5th lens component,
R* is the radius of curvature of the reference spherical surface defined by $$R = \frac{1}{1/R^* + 2a1},$$

ai is the even coefficient of the aspherical surface, and bi is the odd coefficient,
wherein for the value of $\Delta X$ at the height of $R \times 0.7$ in Y ordinate represented by $\Delta X[0.7 \times R]$ and the value of $\Delta X$ at the height of $R \times 0.5$ represented by $\Delta X[0.5 \times R]$, the relationships $$0.0005 < |\Delta X[0.7 \times R]/f| < 0.01$$

$$0 < |\Delta X[0.5 \times R]/f| < 0.0005$$

are satisfied,
wherein both the surfaces of said 3rd lens component are concave surfaces, and both the surfaces of said 4th lens component are convex surfaces,
and wherein the photographic objective performs the focusing by integrally moving the first, second, third and fourth lens components.

* * * * *